United States Patent
De Fornel et al.

(10) Patent No.: US 6,813,292 B2
(45) Date of Patent: Nov. 2, 2004

(54) CONTROLLABLE LOW PROTON SOURCE

(75) Inventors: Frédérique De Fornel, Dijon (FR); Pierre-Noël Favennec, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/221,233

(22) PCT Filed: Feb. 12, 2001

(86) PCT No.: PCT/FR01/00402

§ 371 (c)(1),
(2), (4) Date: Nov. 15, 2002

(87) PCT Pub. No.: WO01/69841

PCT Pub. Date: Sep. 20, 2001

(65) Prior Publication Data

US 2003/0127961 A1 Jul. 10, 2003

(30) Foreign Application Priority Data

Mar. 10, 2000 (FR) .............................................. 00 03096

(51) Int. Cl.$^7$ .................................................. H01S 5/00
(52) U.S. Cl. ............................ 372/43; 372/44; 372/45; 372/46; 372/47; 372/48; 372/49; 372/50; 313/310; 257/10
(58) Field of Search ..................... 372/43–50; 313/310; 257/10

(56) References Cited

U.S. PATENT DOCUMENTS

| 5,675,648 | A | | 10/1997 | Townsend |
| 6,287,765 | B1 | * | 9/2001 | Cubicciotti ................. 435/6 |
| 6,340,806 | B1 | * | 1/2002 | Smart et al. ........... 219/121.62 |
| 2003/0127961 | A1 | * | 7/2003 | De Fornel et al. ......... 313/310 |

FOREIGN PATENT DOCUMENTS

| WO | WO/9744936 | 11/1997 |
| WO | WO/9811457 | 3/1998 |

OTHER PUBLICATIONS

Laporta et al., "10 KHZ–Linewidth Diode–Pumped ER: YB: Glass Laser", Electronics Letters, GB, IEE STEVENAGE, vol. 28 No. 22 p. 2067–2069, XP000320718, Oct. 22, 1992.

* cited by examiner

Primary Examiner—Don Wong
Assistant Examiner—Delma R. Flores Ruiz
(74) Attorney, Agent, or Firm—Cohen, Pontani, Lieberman & Pavane

(57) ABSTRACT

A controllable source of few photons operating at a predetermined wavelength. The source comprises a solid material (10) having a dilute concentration of elements (11) implanted therein that emit light at said predetermined wavelength, an excitation device (20) for exciting said light-emitting elements, and a probe (30) suitable for capturing, by near field coupling, at least one photon emitted by one of the light-emitting elements. The source is applicable to optical telecommunications.

19 Claims, 1 Drawing Sheet

CONTROLLABLE LOW PROTON SOURCE

This application is a U.S. National Phase Application under 35 USC 371 of International Application PCT/FR01/00402 filed Feb. 12, 2001.

FIELD OF THE INVENTION

The present invention relates to a controllable source of few photons operating at a predetermined wavelength.

A particularly advantageous application of the invention lies in the field of optical telecommunications, in particular high security private telecommunication over short distances.

BACKGROUND OF THE INVENTION

In the specification below, the term "source of few photons" is used to mean a light source capable of emitting a single photon or a few photons.

In general, conventional optical telecommunications make use of equipment such as laser sources which are designed to enable photons to be used at high concentrations, so as to obtain maximum light power and greatest possible communication distance.

Nevertheless, work is presently under way toward optical communications systems using very low photon fluxes, going down to systems using single photons (see articles by J.P. Goedgebuer, L. Larger, and D. Delorme, Phys. Rev. Lett., 82, 8, 1656, 1999 and by A. Muller, H. Zbinden, and N. Gisin, Europhys. Lett., 33, 335, 1995). Such few-photon devices are particularly desired for studying quantum cryptography, which relies on photon signatures being modified when they are detected, in application of Heisenberg's uncertainty principle. It is then necessary to be able to manipulate and identify single photons, and consequently to have genuine sources of single photons or to attenuate a flux of photons and work on statistics.

Presently studied sources of few photons are generally based on relatively complicated structures: complex III–V structures (referring to the Periodic Table) with microcavities or very dilute chromophore molecules. However, in any event, such known systems do not give rise to sources of few photons suitable for use in optical telecommunications in order to deploy quantum cryptography.

SUMMARY OF THE INVENTION

An object of the present invention is to provide a controllable source of few photons of predetermined wavelength, the source being simple in structure and having a delivery rate that is low and controllable, and capable of operating at ambient temperature at wavelengths that are of interest for optical telecommunications by fiber, in particular in the near infrared around 1.5 micrometers ($\mu$m).

This and other objects are attained in accordance with one aspect of the present invention directed to a source that comprises a solid material having a dilute concentration of elements implanted therein that emit light at said predetermined wavelength, an excitation device for exciting said light-emitting elements, and a probe suitable for capturing, by near field coupling, at least one photon emitted by one of the light-emitting elements.

Thus, in the source of the invention, photons are emitted by light-emitting elements implanted in the solid material in a quantity that is known and controlled as a function of the desired concentration. They are then captured by the probe using the physical processes associated with near field optics.

To obtain a source of few photons of the invention, the concentration of light-emitting elements per unit area in the solid material is fewer than 10 elements per square micrometer ($\mu m^2$). More particularly, the concentration per unit area is fewer than 1 per $\mu m^2$ for a single-photon source.

The controllable source of few photons of the invention thus makes it possible to implement communications made totally secure by quantum cryptography, whether passing via fiber or via free space without fiber. In the first case, the photon captured by said probe is emitted into free space and then detected by optical transducers. That type of implementation is suitable for short distance communications, of the order of a few tens of meters (m). In the second case, an optical fiber is coupled to said source to convey the captured photon to a detector device. That embodiment can enable communications to be performed between sites that are further apart, up to a maximum radius of 20 kilometers (km), or within business buildings, for example.

Advantageously, the light-emitting element is a rare earth ion selected in particular from the list constituted by erbium, praseodymium, neodymium, and ytterbium. More particularly, the $Er^{3+}$ ion is selected since its emission wavelength situated at 1.5 $\mu$m is in very widespread use in optical fiber telecommunications. The erbium ions are preferably implanted at a dilute concentration in a solid material presenting a very large band gap, in particular electrical insulators, since it is established (Electronics Letters, 25, 11, 718, 1989) that erbium emission at 1.5 $\mu$m and at ambient temperature is obtained under excitation greater than 0.8 electron volts (eV), which requires host materials in which the band gap is at least equal to said value.

In practice, said probe is formed by a fine point of size smaller than 1 $\mu$m. By way of example, it is constituted by the end of an optical fiber made of glass or of silica.

Finally, the source of few photons of the invention presents the advantage of being suitable for being controlled. To this end, provision is made for it to comprise means for controlling capture by the probe of the emitted photon. These means can be means for controlling the distance between the probe and the light-emitting element.

In conclusion, the controllable source of few photons constituting the subject matter of the invention opens the way to quantum optical communications systems with or without fiber, over short distances and made highly secure by the use of quantum cryptography.

BRIEF DESCRIPTION OF THE DRAWINGS

The following description with reference to the accompanying drawing, given as non-limiting examples, explains what the invention consists in and how it can be implemented.

DETAILED DESCRIPTION OF THE DRAWINGS

Figure 1:
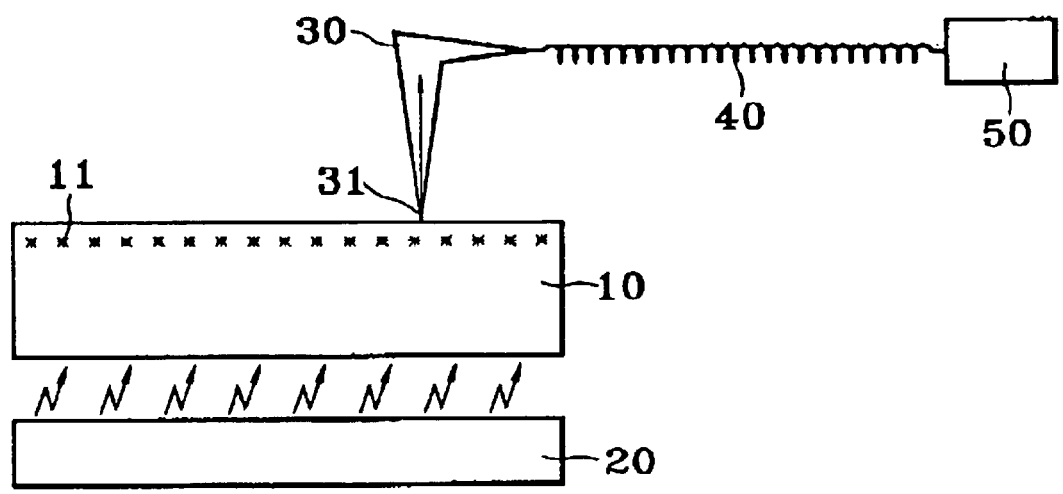
FIG. 1 is a diagram of an embodiment of a controllable source of a single photon in accordance with the invention.

FIG. 1 shows a controllable single-photon source operating at a predetermined wavelength, e.g. 1.5 $\mu$m, the source comprising a solid material 10 or "host" material having light-emitting elements 11 implanted therein, said elements emitting at 1.5 $\mu$m when they are subjected to the radiation produced by an excitation device 20. The preferred element for emitting light at this wavelength is the $Er^{3+}$ erbium ion.

The host material 10 is preferably silica in the form of a chip at is easy to handle, that is dielectric and therefore has a large band gap, and that is favorable to the rare earth emitting light at ambient temperature. Silica also presents the advantage of having oxygen as a main ingredient. It has been shown that in order to increase the optical efficiency of the erbium impurity, it is preferable to use host materials having oxygen or fluorine as main elements (Japanese Journal of Applied Physics, 29, L524, 1990 which is hereby incorporated herein by reference). In addition, this material is chemically stable, and can easily be implanted and annealed up to temperatures of 900° C. without being degraded.

Implantation is performed in compliance with the results of the work of P. N. Favennec et al. (see "L'implantation ionique pour le microélectronilue et l'optoélectronique" [Ion implantation for microelectronics and optoelectronics], published in "Collection Technique et Scientific des Télécommunications" by Editions Mass n, 1993 which is hereby incorporated herein by reference).

The parameters proper of implantation and of annealing are conditioned by the choice of silica. The energy of the ions used can lie in the range 10 kiloelectron volts (keV) to 800 keV. The doses implanted must be compatible with the desired results. For a single-photon source, the concentration per unit area of erbium in the solid material 10 should preferably be less than 1 ion per $\mu m^2$. Annealing is necessary to activate the erbium ions optically, i.e. to ensure that they take up a stable site in the host material and in order to rearrange the silica after it has been disturbed by the ion bombardment, thereby preventing photons being absorbed by the resulting defects. The conditions under which implanted silica chips are best annealed are as follows: 600° C. to 900° C. in temperature and a few seconds (s) to several tens of minutes (min) for annealing time.

Erbium is mentioned above specifically because its emission wavelength at 1.5 $\mu m$ is most advantageous for optical telecommunications. Nevertheless, other chemical species can be used. Among the rare earths, in addition to erbium, mention can be made of praseodymium (1.3 $\mu m$), neodymium (1.06 $\mu m$), and ytterbium (1 $\mu m$). Mention can also be made of uranium which emits at 2.5 $\mu m$. Finally, light-emitting organic molecules can also be suitable.

The solid material 10 is not limited to silica, and can naturally be extended to other materials, providing the selected host material and light-emitting element pair are such that the band gap of the material is less than the radiative transition energy of the light-emitting element. The term "radiative transition energy" refers to the energy differenc between the excited and ground states of the molecule that it radiates when passing from excited state to the ground state. This energy difference is directly related to the wavelength of the radiation.

Apart from silica, other suitable electrically insulating materials include alumina, a nitride, a polymer, a silica or fluorine-containing glass, a fluorine-containing crystal, and a sol-gel (this term refers to a solid gel, i.e. a gel that is applied under a wet form and becomes solid after evaporation). Also suitable are crystalline semiconductors (GaN, GaAs, GaP, GaSb, InP, and derivatives thereof), or non-crystalline semiconductors such as amorphous or polycrystalline silicon.

The excitation device 20 provides photons at a wavelength shorter than the wavelength of the desired light emission. Thus, if it is desired to emit photons at 1.5 $\mu m$ by exciting erbium ions, the exciting beam should contain photons having a wavelength shorter than 1.5 $\mu m$, and can thus be constituted by a light beam situated in the near infrared, in the visible, or in the ultraviolet.

Excitation can be performed by any device 20 that can be controlled electronically using short pulses obtained by photon radiation coming from a laser, a source of white light, or by electron bombardment using an electron gun, for example.

As shown in FIG. 1, a photon emitted by a light-emitting element captured by a probe 30 using the physical mechanism of near field coupling. In general, near field optics (which applies the phenomenon of near field coupling) is the result of interaction between a nanometric element and the total field generated in the vicinity of the light emitting species, where said interaction takes place at a distance that is shorter than the wavelength used ("Les ondes évanescentes en optique et en optoélectronique" by F. de Fornel, publish in "Collection Technique et Scientifique des Télécommunications" by Editions Eyrolles, 1997 (which is hereby incorporated herein by reference). In FIG. 1, said nanometric element is constituted by the probe 30 which is formed by a tapering point 31 of size smaller than 1 $\mu m$ placed at less than 100 nanometers (nm) from the surface of the solid material 10. The function of the probe 30 is thus to capture the photon emitted by the light-emitting element and to guide it to an optical fiber 40 terminated on a detector 50.

The tapering point 31 of the probe 30 can be one end of an optical fiber made of silica, fluorine-containing glass, or of silica doped with erbium or any other rare earth. It can equally well be dielectric or semiconductive, being made of carbon or of silicon. Finally, it can be totally or superficially covered in other materials that are dielectric or metallic.

The light source of FIG. 1 is controlled in intensity by means (not shown) for controlling capture of the emitted photon by the probe 30. These means can be means for controlling the distance between the probe 30 and the light-emitting element, such as piezoelectric components, photoelastic components, or microelectromechanical components.

Figure 2:
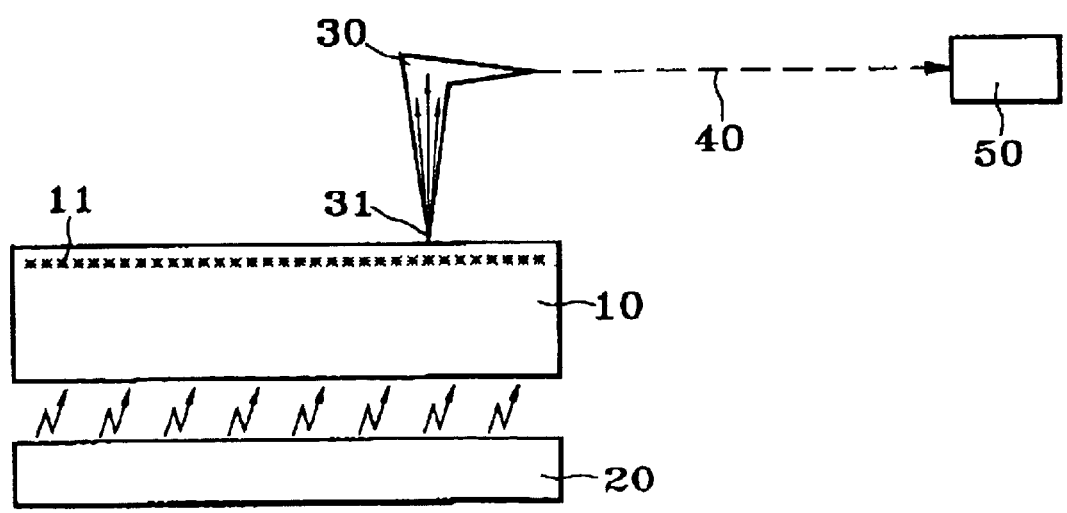
FIG. 2 is a diagram of another embodiment of a source of few photons in accordance with the invention.

The source of FIG. 2 differs from that of FIG. 1, in that this is a source for delivering a few photons so that the concentration per unit area of light-emitting elements is higher but still fewer than 10 per $\mu m^2$. Another difference lies in the fact that the photons captured by the probe 30 are emitted without any fiber into free space until they reach the detector 50. The range of such a source is naturally less than that of a fiber-guided source as shown in FIG. 1.

What is claimed is:

1. A controllable source of few photons of predetermined wavelength, the source being characterized in that it comprises a solid material (10) having a dilute concentration of elements (11) implanted therein that emit light at said predetermined wavelength, an excitation device (20) for exciting said light-emitting elements, and a probe (30) suitable for capturing, by near field coupling, at least one photon emitted by one of the light-emitting elements.

2. A source according to claim 1, characterized in that the concentration per unit area of the light-emitting element in the solid material is fewer than 10 per $\mu m^2$.

3. A source according to claim 2, characterized in that the concentration per unit area is fewer than 1 per $\mu m^2$ for a single-photon source.

4. A source according to claim 1, characterized in that the photon captured by said probe (30) is emitted into free space.

5. A source according to claim 1, characterized in that an optical fiber (40) is coupled to said probe (30) to transport the captured photon.

6. A source according to claim 1, characterized in that said light-emitting element is a rare-earth ion.

7. A source according to claim 6, characterized in that said rare earth ion is selected from the list constituted by: erbium, praseodymium, neodymium, and ytterbium.

8. A source according to claim 1, characterized in that said light-emitting element is uranium.

9. A source according to claim 1, characterized in that said light-emitting element is an organic molecule.

10. A source according to claim 1, characterized in that said solid material (10) is an electrical insulator.

11. A source according to claim 10, characterized in that said electrical insulator is selected from the list constituted by: silica, alumina, a nitride, a polymer, a glass, a fluorine-containing crystal, and a sol-gel.

12. A source according to claim 1, characterized in that said solid material (10) is a semiconductor.

13. A source according to claim 12, characterized in that said semiconductor is selected from the list constituted by: amorphous silicon, polycrystalline silicon, and GaN, GaAs, GaP, GaSb, InP, and derivatives thereof.

14. A source according to claim 1, characterized in that it includes means for controlling the capture of the emitted photon by the probe (30).

15. A source according to claim 14, characterized in that said control means are means for controlling the distance between the probe (30) and the light-emitting element.

16. A source according to claim 1, characterized in that said probe (30) is formed by a tapering point (31) of size smaller than 1 $\mu$m.

17. A source according to claim 16, characterized in that said tapering point (31) is made of a material that is dielectric or semiconductive.

18. A source according to claim 16, characterized in that said tapering point (31) is made of carbon or of silicon.

19. A source according to claim 16, characterized in that said tapering tip (31) is constituted by the end of an optical fiber.

* * * * *